United States Patent [19]
Lai

[11] Patent Number: 5,190,427
[45] Date of Patent: Mar. 2, 1993

[54] COMPUTER-CONTROLLED BLOCK TO BLOCK SHIFTING TYPE MULTI-FLOOR MULTI-BLOCK EQUIPMENT CONVEYING AND STORAGE SYSTEM

[75] Inventor: Nelson Lai, Taipei, Taiwan

[73] Assignee: Necer International Co., Ltd., Taipei, Taiwan

[21] Appl. No.: 769,646

[22] Filed: Oct. 2, 1991

[51] Int. Cl.⁵ .............................................. E04H 6/24
[52] U.S. Cl. ................................. 414/278; 414/236; 414/239
[58] Field of Search .............. 414/231, 233, 234, 236, 414/237, 239, 240, 241, 261, 277, 278; 198/465.1, 465.2, 722

[56] References Cited

U.S. PATENT DOCUMENTS

| | | | |
|---|---|---|---|
| 2,605,911 | 8/1952 | Medway | 414/239 |
| 2,837,224 | 6/1958 | Rosen | 414/236 |
| 3,115,257 | 12/1963 | Kubik | 414/236 X |
| 3,217,905 | 11/1965 | Frangos | 414/239 |
| 3,333,714 | 8/1967 | Sermet | 414/239 |
| 3,554,389 | 1/1971 | Bright | 414/236 |
| 4,217,070 | 8/1980 | Gröger | 414/239 |
| 4,273,053 | 6/1981 | Gibbs | 414/236 X |
| 4,768,914 | 9/1988 | Sing | 414/239 X |
| 4,804,305 | 2/1989 | Lapotaire | 414/233 |
| 5,066,187 | 11/1991 | Hammer | 414/239 X |

FOREIGN PATENT DOCUMENTS

| | | | |
|---|---|---|---|
| 43111 | 4/1981 | Japan | 414/240 |
| 284677 | 11/1989 | Japan | 414/239 |
| 6415192 | 10/1965 | Netherlands | 414/239 |
| 8000690 | 4/1980 | World Int. Prop. O. | 414/239 |
| 8912152 | 12/1989 | World Int. Prop. O. | 414/236 |

*Primary Examiner*—David A. Bucci
*Attorney, Agent, or Firm*—Jacobson, Price, Holman & Stern

[57] ABSTRACT

A computer-controlled, multi-floor, multi-block equipment conveying and storage system having a multi-floor steel framework made of H-beam steels. Each floor is divided into a plurality of equal blocks longitudinally and latitudinally aligned. The blocks include one block serving as a lifting gear access unit for the passing therethrough of a lifting gear which moves from floor to floor for carrying storage items and the other blocks serving as storage units surrounding the lifting gear access unit for storing items. A plurality of driving mechanisms to separately carry a plurality of carrier plates from block to block in a straight direction permits any designated carrier plate in either floor to be moved to the lifting gear access unit of the same floor for delivery to any other floor by the lifting gear.

3 Claims, 6 Drawing Sheets

COMPUTER-CONTROLLED BLOCK TO BLOCK SHIFTING TYPE MULTI-FLOOR MULTI-BLOCK EQUIPMENT CONVEYING AND STORAGE SYSTEM

BACKGROUND OF THE INVENTION

The present invention relates to a multi-floor multi-block equipment conveying and storage system for conveying and storing vehicles or machinery equipment in a multi-floor building in which each floor is divided into a plurality of blocks longitudinally latitudinally aligned, with the block at the center designated as an access for a lifting gear which moves from floor to floor, and with the other blocks surrounded around the block at the center for storing storage items. A plurality of driving mechanisms are monitored and controlled by a computer control system to separately carry a plurality of carrier plates from block to block in straight direction permitting any designated carrier plate in either floor to be moved to the central block at the same floor for delivery to any other floor by the lifting gear.

In cities and population intensive areas, high-rise buildings are the common choice to fully utilize the limited land space. Due to building construction technique problems or improper arrangement and design, the unit cost for each storage or parking unit in a multi-floor storage or parking building is commonly high. For example, according to a conventional method, a passage way must be provided in each floor in a multi-floor parking building so that a car driver can drive a car into a parking space or drive it out of the parking building, that is to say much space shall be provided not for parking purpose but just for the access of cars. Because the passage way occupies much space, the cost for each parking unit is inevitably high. Although there are other structures of parking buildings using a conveying system for parking control, they are still not satisfactory in use because they still can not fully utilize the limited space therein.

SUMMARY OF THE INVENTION

The present invention has been accomplished under the circumstances in view. According to one aspect of the present invention, there is provided a computer controlled, block to block shifting type multi-floor multi-block equipment conveying and storage system which is generally comprised of a multi-floor steel framework made of H-beam steels, in which each floor is divided into a plurality of equal blocks longitudinally latitudinally aligned, which blocks include one serving as a lifting gear access unit for the passing therethrough of a lifting gear which moves from floor to floor for carrying storage items and the others serving as storage units surrounding around said lifting gear access unit for storing storage items, and a plurality of driving mechanisms to separately carry a plurality of carrier plates from block to block in straight direction permitting any designated carrier plate in either floor to be moved to the lifting gear access unit of the same floor for delivery to any other floor by said lifting gear. By means of the control of the computer control system any specific carrier plate in any specific storage unit and the storage item thereon can be conveniently rapidly moved to any other storage unit in another floor in the storage building.

According to another aspect of the present invention, the driving mechanisms are separately controlled by a computer control system to drive the cylinders thereof to operate separately so as to adjust the level position of the corresponding motors and the rubber wheels thereon, and therefore, causing the corresponding rubber wheels to be moved upwards for supporting the carrier plate thereon or to be moved downwards and disconnected from the carrier plate thereon. When a carrier plate is supported on the rubber wheels on the specific driving mechanisms, it can be moved forwards, backwards, leftwards or rightwards by means of the operation of the motors of the specific driving mechanism to drive the linked rubber wheels through the control of the computer control system. Therefore, every carrier plate can be separately moved from block to block in longitudinal or latitudinal direction. By sending a carrier plate in one storage unit in one floor to the lifting gear access unit of the same floor through the monitoring and the control of the computer control system, the carrier plate and the storage item thereon can be quickly delivered by the lifting gear to any other floor and then carried by the driving mechanisms in the designated floor to any designated storage unit therein. Therefore, high efficiency in delivery can be achieved and, management and personnel cost can be greatly reduced.

According to still another aspect of the present invention, there are provided steel beams longitudinally latitudinally mounted on the H-beam steels in each storage unit below the carrier plate thereon which steel beams define therein longitudinal and latitudinal tracks interconnected with one another through which the pulleys which are mounted on the bottom edge of the carrier plate are guided to move forwards or backwards. Therefore, the carrier plate in either storage unit can be stably moved in longitudinal or latitudinal direction.

DETAILED DESCRIPTION OF THE PREFERRED EMBODIMENT

Figure 1:
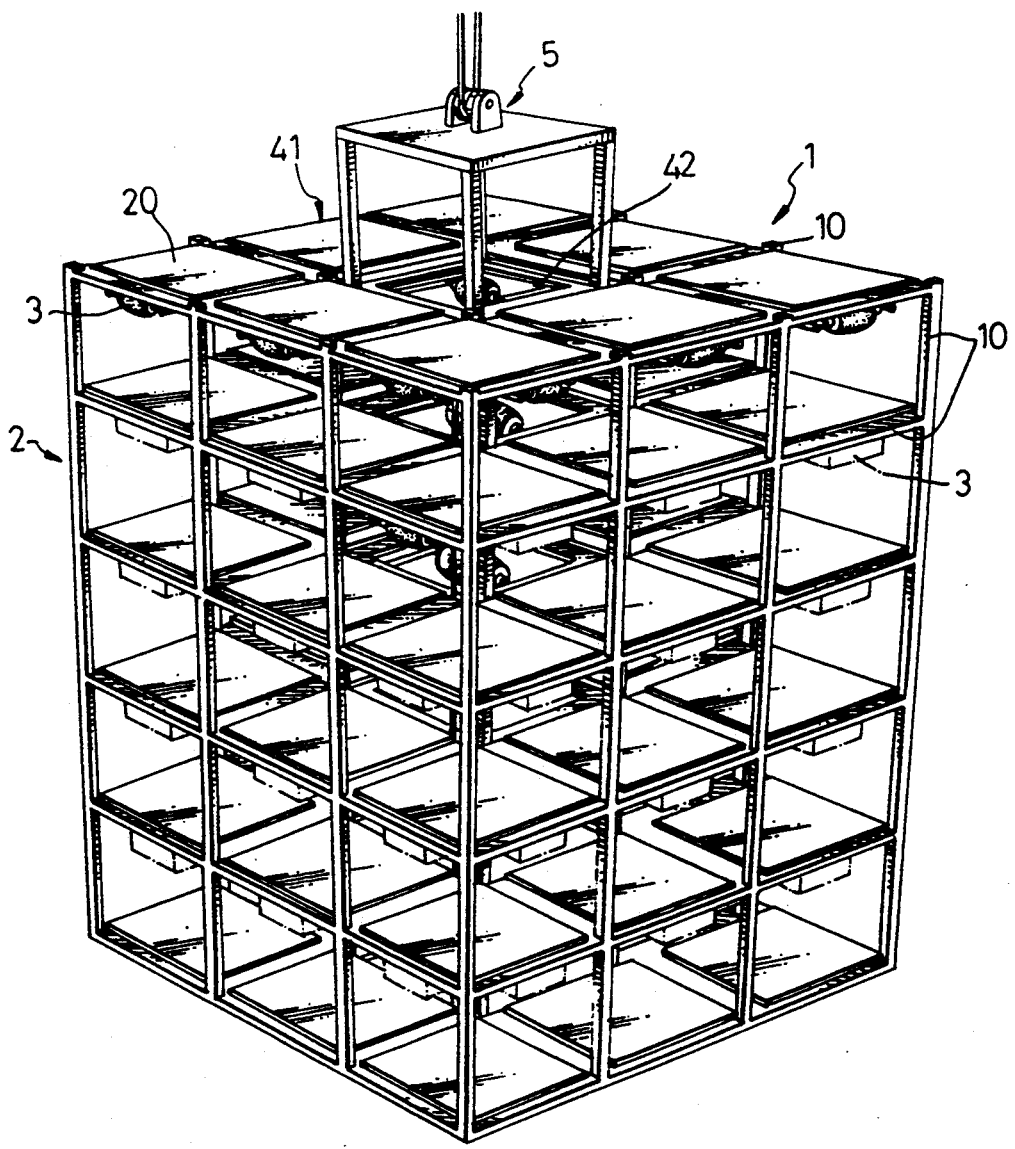
FIG. 1 is a perspective view of a multi-floor multi-block storage building as constructed according to the present invention.
Figure 3:
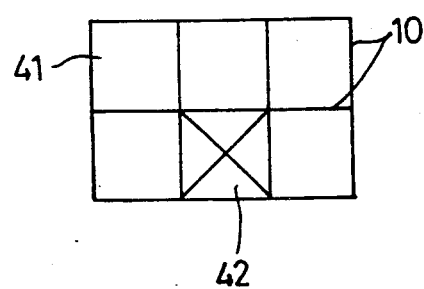
FIG. 3 is a plan view of an alternate form of multi-floor multi-block storage building of the present invention.
Figure 7:
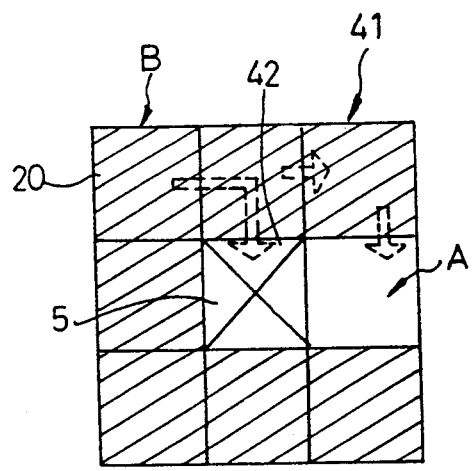
FIG. 7 is a plan view showing an example of storage arrangement and the operation in moving the carrier plate from one corner storage unit to the lifting gear access unit for delivery to any other floor.

Referring to FIG. 1, therein illustrated is a multi-floor multi-block equipment storage building 1 as constructed in accordance with the present invention, which has a steel framework made of H-beam steels 10, and in which each floor 2 is divided into a plurality of equal blocks, namely, a plurality of storage units 41 for storing equipment or vehicles and a lifting gear access unit 42 for the passing therethrough of a lifting gear 5. As illustrated in FIGS. 3 and 7, the lifting gear access unit 42 is surrounded by the storage units 41 and, the number of the storage units 41 in each floor is determined according to actual requirement.

Figure 2:
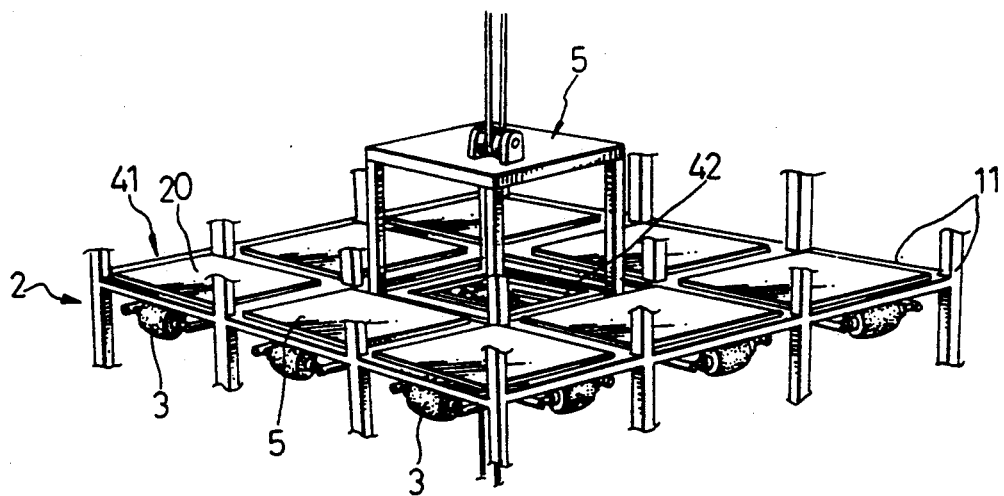
FIG. 2 is a perspective view of either floor of the multi-floor multi-block storage building.

Referring to FIG. 2, in each storage unit 41 in each floor 2 of the building 1, and the bottom framework of a lifting gear 5 there are provided a plurality of independent driving mechanisms 3 respectively mounted on the steel beams 11 thereof and controlled by a computer to respectively carry a plurality of carrier plates 20 which are respectively movably placed on the storage units 41 in each floor 2. By means of the control of the computer, a designated carrier plate 20 in either floor 2 can be moved to any storage unit 41 or any designated carrier plate 20 can be moved from any storage unit 41 to the lifting gear 5 which has been lifted to the lifting gear access unit 42 of the same floor. Therefore, by means of the operation of the lifting gear 5, any equipment loaded on the designated carrier plate 20 can be carried to any other floor, i.e. any equipment can be delivered to either storage unit in either floor.

Figure 4:
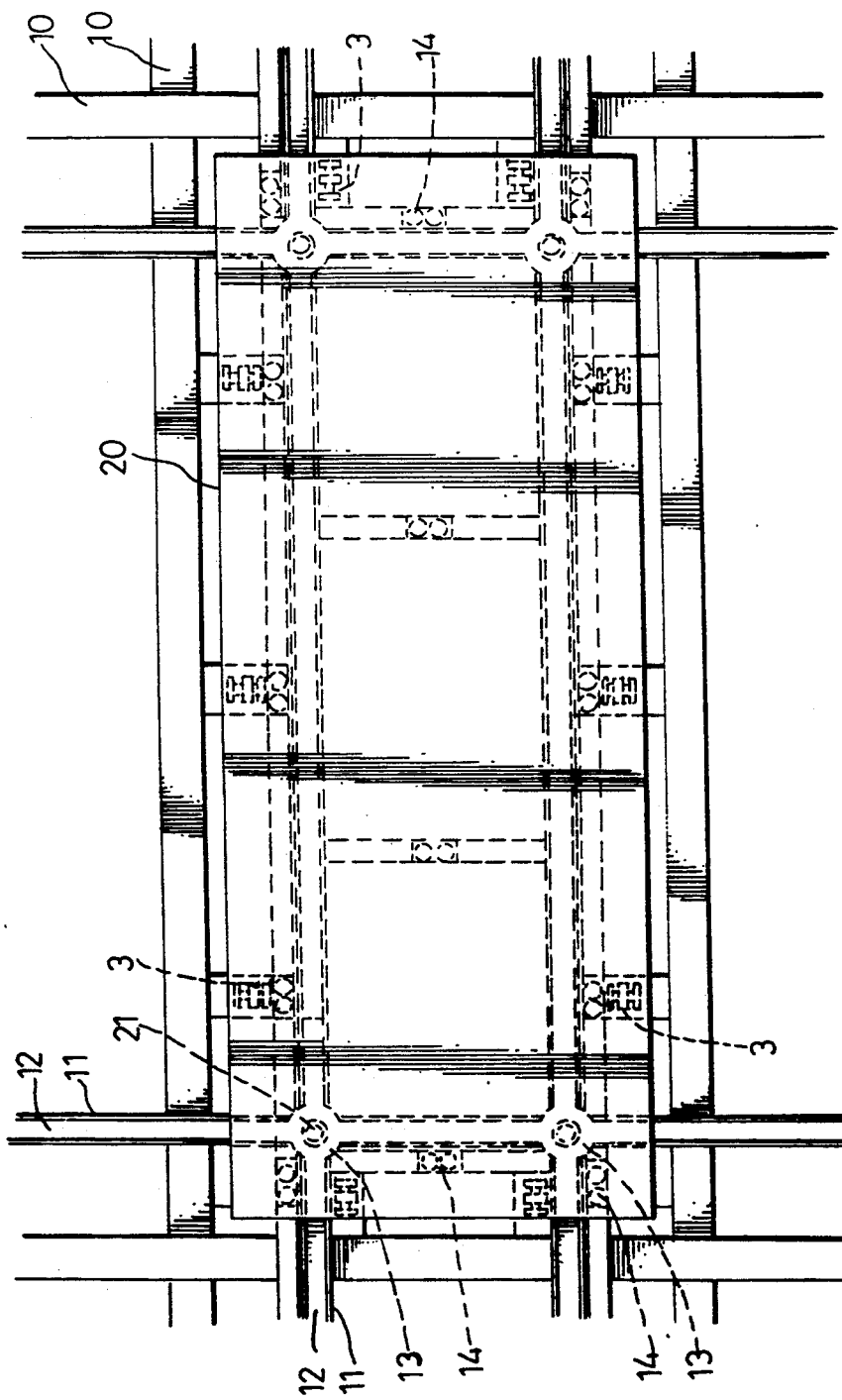
FIG. 4 is an arrangement plan of a storage unit showing the arrangement of the driving mechanisms in the steel beams and the H-beam steels thereof.
Figure 5:
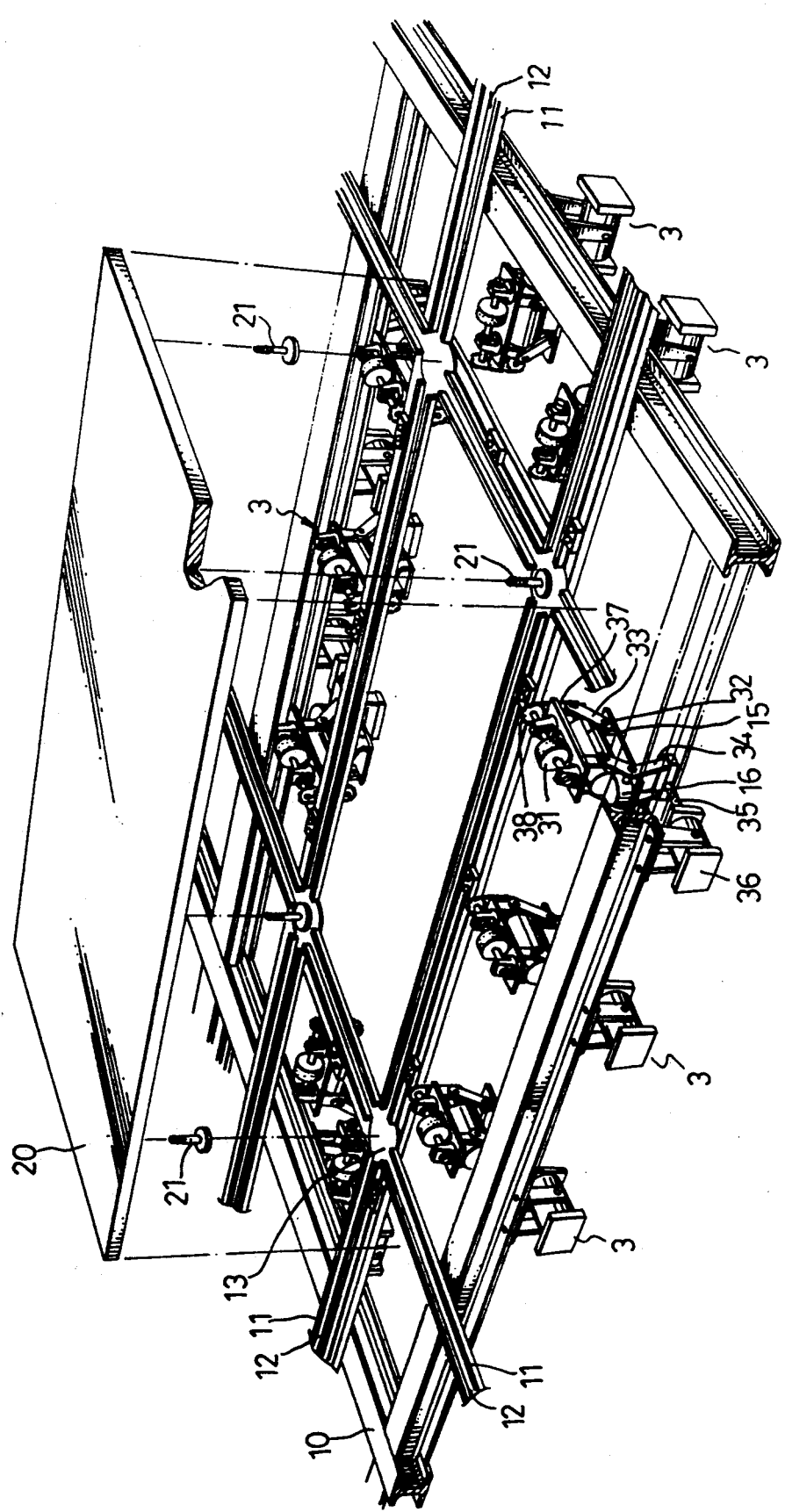
FIG. 5 is a perspective view of the arrangement of FIG. 4.
Figure 6:
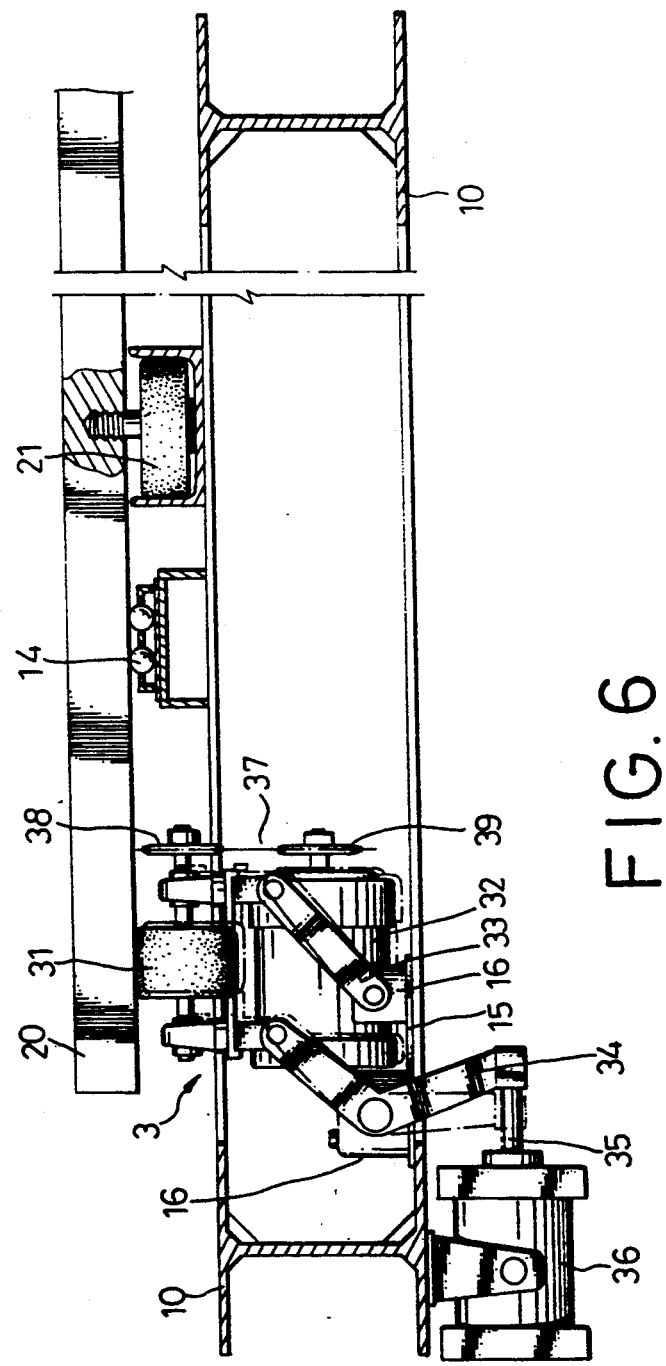
FIG. 6 is a side view of the arrangement of FIG. 4.

Referring to FIG. 4, every four H-beam steels 10 are arranged in rows and columns with a storage unit defined therein in which there are also four steel beams 11 arranged in rows and columns in each storage unit within the four H-beam steels thereof, wherein the steel beams 11 each defines therein a track 12 in longitudinal direction and has a plurality of ball bearings 14 at suitable locations to support the carrier plate 20 thereon permitting the gravity of the load on the carrier plate 20 to be uniformly distributed through the steel beams 11 and the H-beam steels 10. Therefore, centralized stress problem can be eliminated. Further, the carrier plate 20 has a plurality of pulleys 21 fastened thereto by screw rods at the bottom at locations corresponding to the connections 13 between the tracks 12. The pulleys 21 are made in such a size that they can be moved in either track 12. Around the periphery of the carrier plate 20 there are provided a plurality of driving mechanisms 3 at the bottom. As illustrated in FIGS. 5 and 6, each driving mechanism 3 is comprised of a rubber wheel 31, an electric speed reducing motor 32, two adjusting levers 33, two cranks 34, a cylinder link 35 and a cylinder 36. The rubber wheel 31 is coupled to a gear 39 on the output shaft of the motor 32 by a chain 37. The two adjusting levers 33 each has one end connected to the motor 32 at one end at either side and an opposite end connected to a bearing block 16 on a raised plate 15 which is made on either H-beam steel 10 in either storage unit. The two cranks 34 each has one end connected to the motor 32 at an opposite end at either side and an opposite end connected to the link 35 of the cylinder 36 which is fastened in the corresponding H-beam steel 10 at the bottom. The upper parts of the cranks 34 which are connected to the motor 32 are respectively disposed in parallel with the adjusting levers 33, and the middle parts of the cranks 34 are respectively pivoted to another bearing block 16 on the same raised plate 15.

Moving a carrier plate 20 is made and monitored through a computer control system (This is not within the scope of the present invention and will not be described further). By means of the control of a computer control system, the cylinder 36 of the designed driving mechanism 3 is caused to move back the link 35 thereof. While the link 35 is moved backwards, the cranks 34 are rotated forwards downwards (relative to the cylinder 36), at the same time, the adjusting levers 33 are caused to make a synchronous motion, and therefore, the motor 32 and the connected rubber wheel 31 are moved downwards from the carrier plate 20 thereon. When the two rubber wheels 31 of the two driving mechanisms 3 at the rear end or front end (or at the left side or right side) in the designed storage unit are disconnected from the carrier plate 20 therein, the cylinders 36 of the other two driving mechanisms 3 at the front end or rear end (or at the right side or left side) are controlled to push out the links 35 thereof causing the two linked motors 32 and the two linked rubber wheels 31 to be moved upwards by the linked cranks 34 and adjusting levers 33 for supporting the carrier plate 20. The two motors 32 of the two driving mechanisms 3 at the front end or rear end (or at the right side or left side) are then controlled by the computer control system to rotate the linked two rubber wheels 31 in clockwise (or counter-clockwise) direction for carrying the carrier plate 20 thereon through the corresponding tracks 12 toward the designated storage unit.

FIG. 7 is a plan view showing an example of storage arrangement and the operation in moving the carrier plate from one corner storage unit to the lifting gear access unit for delivery to any other floor. As illustrated, the floor space is divided into nine equal unit blocks longitudinally latitudinally aligned, namely, a lifting gear access unit 42 at the center surrounded by eight storage units 41, wherein seven of the storage units are respectively equipped with a carrier plate 20 for storing a storage item while the block (storage unit) A is kept in blank (without carrier plate). The storage item on a carrier plate 20 in either storage unit 41 adjacent to the lifting gear access unit 41 can be directly carried by the supporting carrier plate 20 to the lifting gear 5 for moving to any other floors. For moving the carrier plate B in the storage unit 41 at either diagonal block to the lifting gear access unit 42 for further delivery by the lifting gear 5 to any other floor, the carrier plate 20 in the nearest storage unit 41 adjacent to the blank block A shall be firstly moved by the driving mechanisms 3 therebelow to the driving mechanisms 3 in the blank block A so that the carrier plate 20 next to the carrier plate B can be moved to the storage unit adjacent to the blank block A for the passing therethrough of the carrier plate B to the lifting gear access unit 42.

Figure 8:
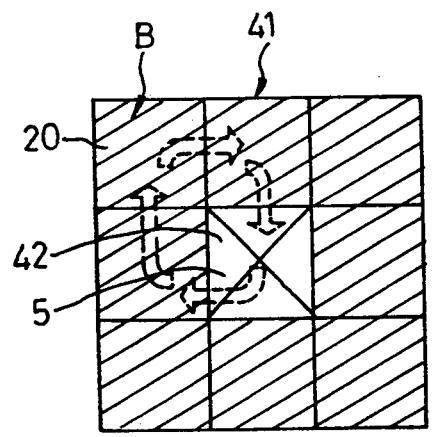
FIG. 8 is a plan view showing another example of storage arrangement and the operation in moving the carrier plate from one corner storage unit to the lifting gear access unit for delivery to any other floor.

FIG. 8 is a plan view showing another example of storage arrangement and the operation in moving the carrier plate from one corner storage unit to the lifting gear access unit for delivery to any other floor. In this arrangement, the eight storage units 41 which surround the lifting gear access unit 42 are all equipped with a carrier plate 20 each. The carrier plate 20 in either adjacent storage unit 41 and the storage item thereon can be directly moved in straight course (either in longitudinal or latitudinal direction) to the lifting gear access unit 42 for further delivery by the lifting gear 5 to any other floor. For moving the carrier plate B in either corner block and the storage item thereon to the lifting gear access unit 42, the carrier plate 20 adjacent to the designated corner block and the lifting gear access unit 42 shall be firstly moved to the lifting gear access unit 42 to clear a space for the passing therethrough of the carrier plate B. Blank space is changed while moving the carrier plate from one block to another. By means of this operation, the carrier plate B in either corner block and the storage item thereon can be conveniently moved to the lifting gear access unit 42 for further delivery by the lifting gear 5 to any other floor.

As indicated, any storage item can be carried by a carrier plate to store at any storage unit in any floor inside the storage building. The carrier plate in any storage unit adjacent to the lifting gear access unit can be quickly shifted to the lifting gear access unit through one operation procedure. The carrier plate in either diagonal corner block can also be conveniently shifted to the lifting gear access unit through three to five operational steps.

What is claimed is:

1. A multi-floor, multi-block equipment conveying and storage system, said system comprising:
    a multi-floor steel framework made of H-beam steel, each floor of said framework being divided into a plurality of equal blocks longitudinally and latitudinally aligned, said equal blocks being formed into a plurality of equal storage units for storing storage items,
    a lifting gear access unit located centrally with respect to each floor for the passing therethrough of a lifting gear through a center of each floor, said lifting gear being controlled to move from floor to floor,
    said storage units and said lifting gear each having a plurality of driving mechanisms mounted on the steel H-beams therein and separately controlled to move separate carrier plates from block to block in a straight direction and permitting a designated carrier plate in any floor to be moved to the lifting gear access unit of a same floor for delivery to any other floor by said lifting gear,
    said driving mechanisms being respectively mounted on the steel H-beams around each storage unit, and a bottom framework of a driving mechanism including a rubber wheel coupled to a gear on an output shaft of a motor by a chain and driven by said motor to carry a carrier plate, two adjusting levers and two cranks respectively connected between said motor and two bearing blocks on each steel H-beam, and a cylinder connected to said two cranks by a link to move said link alternatively back and forth causing said rubber wheels to be moved upwards for supporting the carrier plate thereon and to be moved downwards and disconnected from the carrier plate thereon.

2. The conveying and storage system of claim 1, wherein a plurality of steel beams are longitudinally latitudinally mounted on the H-beam steels in each floor and, said steel beams each forming a track in longitudinal direction and a plurality of switching points at connections with one another.

3. The conveying and storage system of claim 1, wherein each carrier plate has a plurality of pulleys on a bottom edge thereof at locations corresponding to switching points on tracks of the steel beams in either storage unit, said pulleys being carried to move in the tracks of the steel beams.

* * * * *